United States Patent [19]

Olsen

[11] Patent Number: 5,052,419
[45] Date of Patent: * Oct. 1, 1991

[54] BRUSH HEAD, A METHOD AND A MACHINE FOR MANUFACTURING THEREOF

[75] Inventor: Hans Olsen, Klampenborg, Denmark

[73] Assignee: Professional Dental Technologies, Inc., Batesville, Ak.

[ * ] Notice: The portion of the term of this patent subsequent to Sep. 26, 2006 has been disclaimed.

[21] Appl. No.: 380,898

[22] Filed: Jul. 17, 1989

Related U.S. Application Data

[63] Continuation of Ser. No. 59,663, Jun. 8, 1987, Pat. No. 4,869,277, which is a continuation-in-part of Ser. No. 591,114, Feb. 17, 1984, abandoned.

[51] Int. Cl.⁵ .................. A61C 3/06; A61C 17/00; A46B 13/02; A46D 1/08
[52] U.S. Cl. .................. 132/322; 15/180; 264/243; 300/21; 425/805
[58] Field of Search ............ 15/159, 180, 181, 182, 15/183, 167.1; 300/2, 7, 19, 10, 21; 264/243; 425/805; 433/166, 134; 132/321, 322

[56] References Cited

U.S. PATENT DOCUMENTS

| | | | |
|---|---|---|---|
| 1,809,494 | 11/1932 | Priest | 15/180 |
| 3,120,671 | 2/1964 | Miller | 15/180 |
| 3,604,043 | 9/1971 | Lewis | 15/159 |
| 3,910,637 | 10/1975 | Lewis | 300/2 |
| 3,978,852 | 9/1976 | Annoui | 15/22 A |
| 4,447,208 | 5/1984 | Kawai | 433/166 |
| 4,869,277 | 9/1989 | Olsen | 15/167.1 |

Primary Examiner—John G. Weiss
Attorney, Agent, or Firm—William J. Sapone

[57] ABSTRACT

A brush head for cleaning and massaging the teeth and gums is disclosed having a bundle of parallel fibers welded together to form a bottom plate. The brush head is produced by continuously feeding the parallel fibers to a heated mandrel, partially melting one end of the fiber bundle to form a bottom plate with a surplus of melted material extending away to form an extended bottom plate. The extended bottom plate is removed, leaving a bottom plate which is sufficiently rigid so as to be directly attachable to a driving device. The welded bottom plate assures that fibers remain firmly attach to prevent fibers from loosening or separating from the brush.

6 Claims, 4 Drawing Sheets

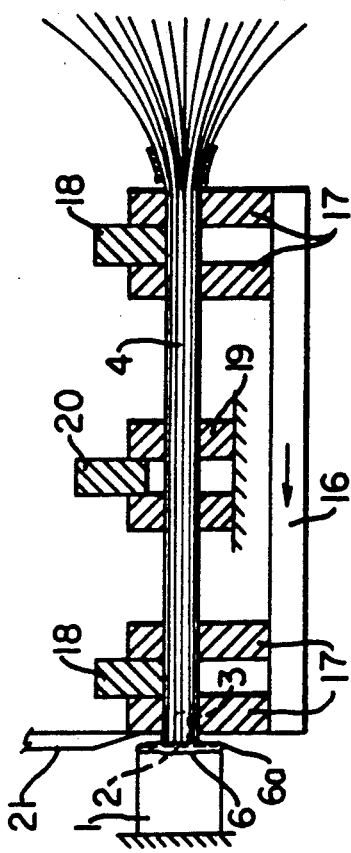
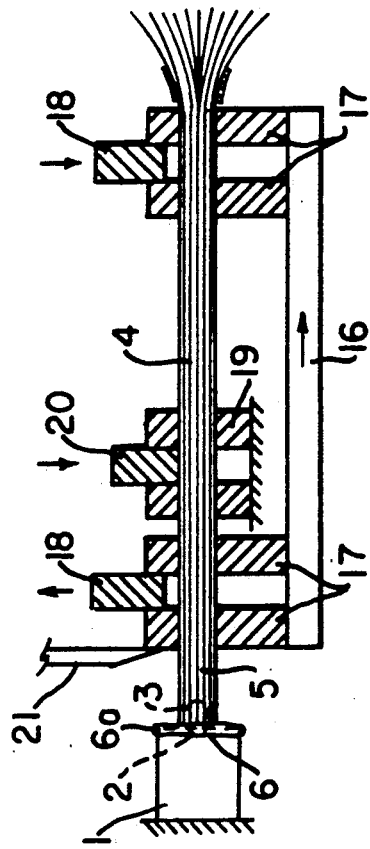
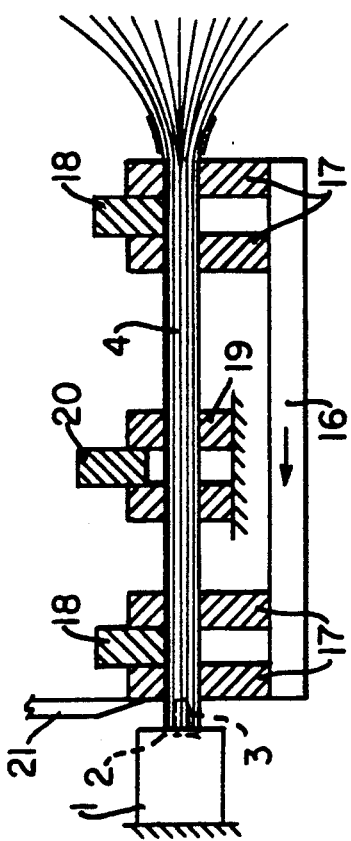
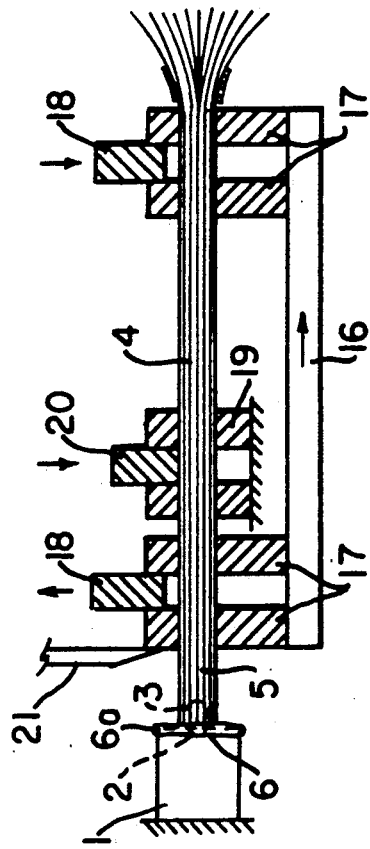

BRUSH HEAD, A METHOD AND A MACHINE FOR MANUFACTURING THEREOF

This is a continuation of application Ser. No. 059,663, filed June 8, 1987, now U.S. Pat. No. 4,869,277, which is a continuation-in-part of application Ser. No. 591,114, filed Feb. 17, 1984, which is now abandoned.

BACKGROUND OF THE INVENTION

The invention relates to a brush and a method for producing a brush head particularly for dental use, and a machine for carrying out the method.

The brush head produced in accordance with the invention is particularly suitable for the so-called preventive dental care which includes cleaning of the teeth and massage of the gums to prevent caries and infection of the gums, including periodontics, etc. The brush head produced according to the invention can be used both on the dentist's drill and on homecare devices such as, for example, battery-driven dental care equipment with rotating drive mechanisms Known methods for producing brush heads include the step of carrying forward of a certain amount of fibers towards a hot tool so that the end of the fiber bundle is pressed hard against the heating head prior to the heating The fibers are then melted together at their ends for the formation of the bottom which will then consist of the melted together fiber material which has been pressed toward the heating head. However, it is very difficult to ensure a constant amount of fiber material for the melting of the bottom, in that it is difficult in practice to obtain precisely the same abutment pressure on the tool every time. This is because the surface of the fibers is very smooth, and displacement will tend to occur between the feed mechanism and the fiber bundle. This gives different material amounts for the formation of the bottom, and if the fibers slide back in the feed mechanism retainer, the amount of material available will be insufficient in order to form the bottom and hold the fibers together in the bottom. This gives a risk of fibers working loose with consequent inconvenience for the user of the brush. Moreover, the bottom may become oblique in that the material is distributed unevenly at the bottom which provides bad contact with the retaining device to which the brush head is attached.

It is the object of the invention to overcome these drawbacks by the known method, and this is achieved by an oblong fiber bundle which while held together is carried forward towards a heated melting tool for the formation of the bottom plate for the fibers, in that the fiber bundle during the melting is constantly carried forward toward the tool so that an extended bottom plate is formed, whereafter the fibers are cut off and the extended bottom plate is removed for the formation of the finished brush head.

This does to a great extent guarantee that the same amount of fibers is melted for the formation of the bottom in that the fibers are carried forward concurrently with the melting, and therefore no significant degree of pressure need be applied for pressing them against the tool. Hereby problems with insufficient fiber material are avoided, the only requirement being that the fibers are carried forward concurrently with their being melted at the ends. Moreover, a considerably stronger bottom is obtained in that there will always be abundant material for the actual bottom, whereas the remaining material is pressed out for the formation of a further ring member at the bottom which is later removed.

A further object of the invention is to provide a method of producing a brush head whereby it is both cheap and quick to produce the brush heads, and which in their production are provided with such a shape that they can effectively clean the teeth and massage the gums without in any way damaging the teeth or the gums. This object is achieved by producing the brush head as presented and characterized in claim 1. With just a few working operations and simple tools, one can produce a brush head so cheaply that it is possible to use the brush as a disposable brush which can be discarded after use, even though it is robust enough to be used repeatedly. The fact that it is disposable makes the brush particularly suitable for use in clinics, in that cleaning of the brush after use is avoided, whereas in the home-care of the teeth the same brush can be used innumerable times because it can be cleaned in the same way as a normal toothbrush, i.e. under running water.

OBJECTS OF THE INVENTION

The method according to the invention substantially reduces the cost of production of the brush by the use of one of the many usable synthetic materials which can be welded ultrasonically, and whereby the bottom plate and the bottom hole are produced in one operation while at the same time an effective securing of all the fibers is achieved. Depending on the material which is used, either one or several weldings are carried out in immediate succession.

A brush head with the improved cleaning ability is produced by manufacturing a brush head having a concave end with a rounded tip by mechanically machining the bundle of fibers, for example while securing the brush head in the bottom plate and the bottom hole, in that during the machining the brush head rotates around an axis through the bottom hole.

By producing the brush head of the invention, a good joining together of the fibers in the center of the brush head is achieved, the result being a firm and suitably stiff brush head which can be held precisely and securely on an ordinary clinical drill or a battery-driven home-care device.

By producing the brush head of the invention, a cup-formed brush is obtained with only one further operation.

By using the machine of the invention having a system of sliding and stationary retaining members for the fibers, the method of manufacturing can be automatized and the rate of production increased.

The machine enables the invention to control the two pairs of clamping jaws, the fiber bundle can be carried forward in a simple reciprocating motion of the retaining members.

By utilizing in the machine the clamping jaws having a pressure jaw therebetween, the clamping function can be achieved merely by moving the pressure jaw into abutment with and away from the fiber bundle.

There is a need for a brush for the cleaning of the teeth and massage of the gums which can be mounted on the dentist's clinical drill or on a home-care device such as battery-driven dental care equipment. During rotation, the brush must be capable of cleaning the teeth and massaging the gums without the rotational movement in any way causing damage to the teeth or gums. This is achieved by a brush of the invention.

The active end of the brush can be shaped to accomplish various cleaning or massaging functions.

Although the brush produced in accordance with the invention can be used for other functions, for example polishing of the nails and the like, it is produced and shaped especially for the cleaning of teeth and massage of the gums, in that the brush's special shapes make this possible without the subsequent damage which is known from other similar devices.

BRIEF DESCRIPTION OF THE DRAWINGS

Other objects and advantages of the invention will become apparent upon reading the following detailed description and upon reference to the drawings, in which:

FIG. 13 shows the machine with the fibers carried forward towards the melting tool, FIG. 14 shows the machine during melting and travelling of the fibers, FIG. 15 shows the machine during the cooling of the bottom and the returning of the sliding bracket, FIG. 16 shows the machine during the cutting-off of the finished brush head.

While the invention will be described in connection with a preferred embodiment and procedure, it will be understood that it is not intended to limit the invention to that embodiment and procedure. On the contrary, it is intended to cover all alternatives, modifications and equivalents as may be included within the spirit and scope of the invention as defined by the appended claims.

DETAILED DESCRIPTION OF THE INVENTION

Figure 1:
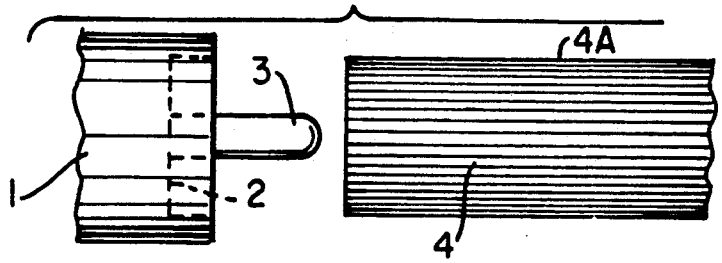
FIG. 1 shows a bundle of fibers and a tool for forming the bottom plate and the bottom hole in the brush head.

In FIG. 1 of the drawing is seen a bundle of fibers 4 consisting of many parallel, thin threads or fibers of a suitable material, for example one of the heat-weldable nylon materials such as polyamide or similar suitable material. For instance, a nylon fiber material with the designation DuPont Code 0900 MA can be used, in which case there are used 1000-5000 fibers in bundle 4.

Figure 2:
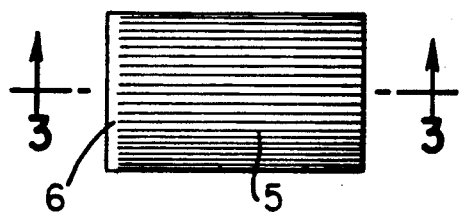
FIG. 2 shows the fiber piece cut off and with bottom plate.
Figure 3:
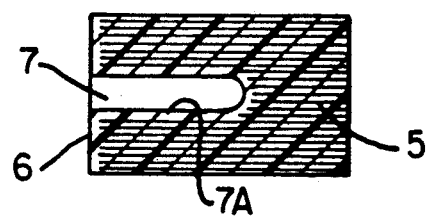
FIG. 3 shows a plane section along the line III—III in FIG. 2.
Figure 4:
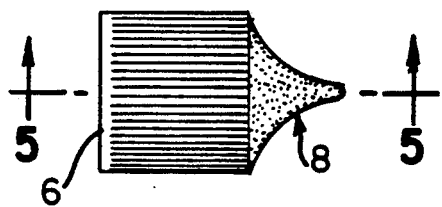
FIG. 4 shows the finished brush head according to the invention.
Figure 5:
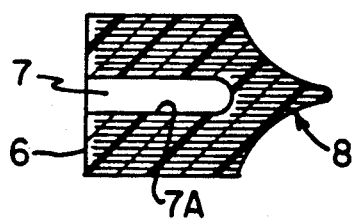
FIG. 5 shows a section along the line V—V in the finished brush head shown in FIG. 4.

Opposite the bundle of fibers is shown a tool 1 with a protruding tip or mandrel 3 and a circular recess 2 around the protruding tip 3. The fiber bundle 4 is held together by a suitable tool or a holster which surrounds the bundle 4 and holds the fibers together. The fiber bundle is mainly circular in cross section. The end of the fiber bundle is pressed against the tool 1 or, vice versa, the tool is pressed against the end of the fiber bundle, in that the tool is heated or has been heated so that the end of the fiber bundle is melted and welded to form a bottom plate 6, as shown in FIG. 2. The welding together can be effected by any means of heating the tool 1, but ultrasonic heating is to be preferred, in that the tool is provided directly with a built-in ultrasonic transducer with a frequency of, for example, approx. 40,000 Hz, thus providing a simple manner by which the heating and therewith the welding together can be controlled. At the same time, a bottom hole 7 is formed by the mandrel or tip 3, see FIG. 3, in that the walls of the hole are also formed by fibers which have been melted together, so that all fibers in the bundle are now secured, either by the bottom plate 6 or the walls or the bottom of the hole 7. A suitable piece 5 is then cut from the bundle 4, see FIGS. 2 and 3, which is then again ready for the production of a bottom plate, possibly with bottom hole.

Naturally, the welding-together process depends on which material is used for the brush head. If the material mentioned above is used, it has proved advantageous to carry out two weldings separated by a short period of time for cooling. The fiber bundle is first joined together lightly, after which the actual welding is effected. The result is a firm and secure joining together of all the threads without the bottom plate becoming too thick, which gives too stiff a brush.

When all of the fibers are secured by the bottom plate 6 or the walls or bottom of the hole 7, the brush part 8 of the brush head can be given its final machining. This machining is preferably carried out with mechanical tools which cut or grind the brush part 8 to provide a concave end, the tip of which is rounded so that it can be introduced between the teeth and into the space between the teeth and the gums for cleaning and massaging without damaging neither the teeth or the gums.

The bottom hole 7 is so formed that it almost reaches to the area where the concave end begins, whereby all the fibers are firmly secured and held so that they still lie parallel with each other and with the bottom hole 7. The wall of the bottom hole is partly flexible, thus enabling the brush head to be mounted on many different kinds of rotating tools, merely providing that these have a spindle or mandrel which fits in the bottom hole 7.

Figure 6:
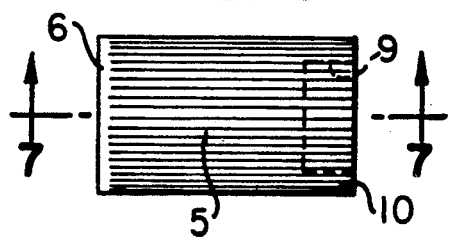
FIG. 6 shows a second embodiment of a finished brush head according to the invention.
Figure 7:
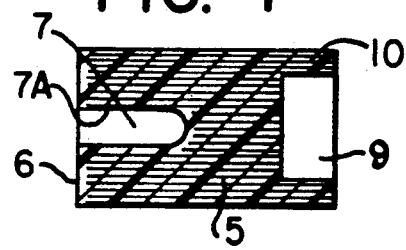
FIG. 7 shows a plane section along the line VII—VII in the brush head shown in FIG. 6.
Figure 8:
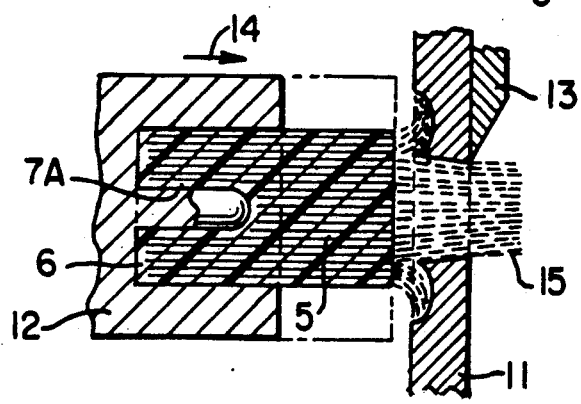
FIG. 8 shows a holding and cutting tool for use in the production of the brush shown in FIGS. 6 & 7.

The brush head can also be machined so that it is provided with a cup-shaped form, as shown in FIGS. 6 and 7, in that the central part 9 of the brush head is removed by being cut off, the result being that the brush head is left with a circular edge 10. This brush is particularly suitable for cleaning the surfaces and the sides of the teeth A tool for use in the cutting out of the central bottom hole 9 is shown in FIG. 8. A holder 12 secures the produced brush 5 so that the free brush ends point towards an ancillary tool 11. When the holder feeds the brush head 5 in the direction of the arrow 14 towards the ancillary tool 11, which is circular in form, only the central part 15 will pass through the hole in the ancillary tool 11, where said central part 15 is cut off with a knife 13. The brush head is thus provided with a bottom hole 9 as shown in FIGS. 6 and 7.

For certain tools used in dental treatment, it is not necessary for the brush head to be provided with a bottom hole 7. In such cases it is sufficient to use an even more simple tool 1, in that one can use a tool without the protruding tip or mandrel 3 shown in FIG. 1.

FIGS. 9-16 show the method and an example of a machine for producing the brush head. In these figures only parts directly involved in the manufacturing process are shown.

Figure 17:
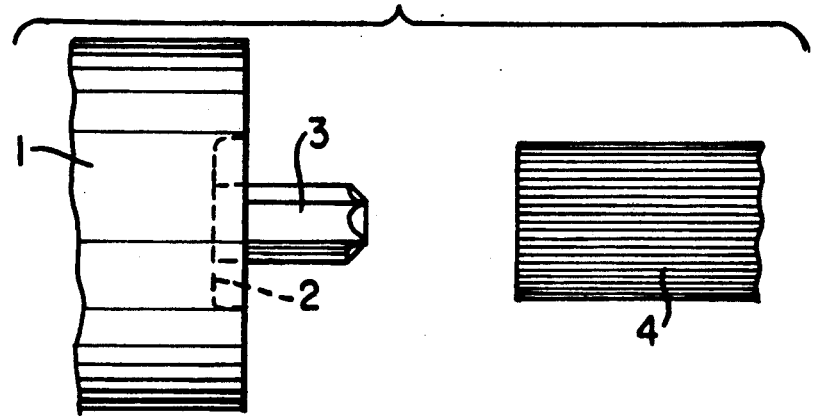
FIG. 17 shows the tool and fiber bundle on a larger scale.
Figure 18:
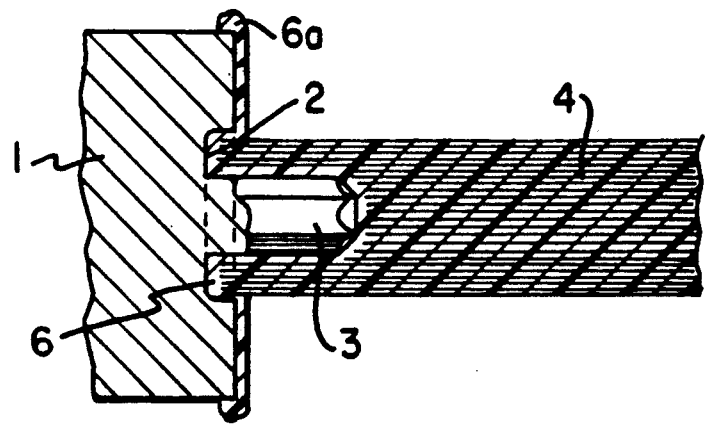
FIG. 18 is a section through the tool during the fiber melting.

The actual melting tool comprises a tool which can be heated by means of ultrasound, said tool consisting of a cylindrical part 1, which at its end is provided with a mandrel 3 which, as shown in FIGS. 17 and 18, can have a hexagon cross section.

Around the mandrel 3 there is an annular hollowing 2 for the formation of the bottom 6 of the brush head. This tool is mounted stationarily on the other part of the machine which is not shown.

The fiber bundle 4 is fed from not-shown coils over a funnel into the actual retainer and transportation part which is attached to a sliding bracket 16 which is reciprocating in relation to the tool I and which slides on the other part of the machine (not shown).

To the bracket 16 are fitted two pairs of clamping jaws 17 provided with through-going holes through which the bundle of fibers 4 run.

Between these clamping jaws is inserted a pressure jaw 18 which can be moved against the fiber bundle and hold this in the clamping jaws 17 and which when moved away from the fiber bundle will release this.

Between these two pairs of clamping jaws is fitted a stationary clamping jaw 19 with a pressure jaw 20, said clamping jaw being attached to the other part (not shown) of the machine.

Finally is fitted a knife 21 at the end of the frontmost clamping jaw 17 for cutting the fiber bundle when one item is melted and finished.

The method will now be described in further detail.

Figure 9:
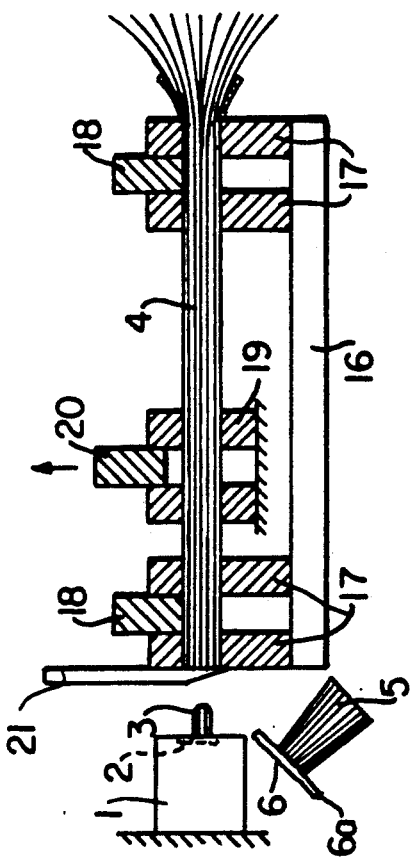
FIG. 9 shows a section through a machine after the cutting-off of a finished melted brush head.

The starting point is, as shown in FIG. 9, the time when a melted and finished brush head 5, 6 has been cut off by a knife 21 and is on its way downwards in the direction of the arrow.

Figure 10:
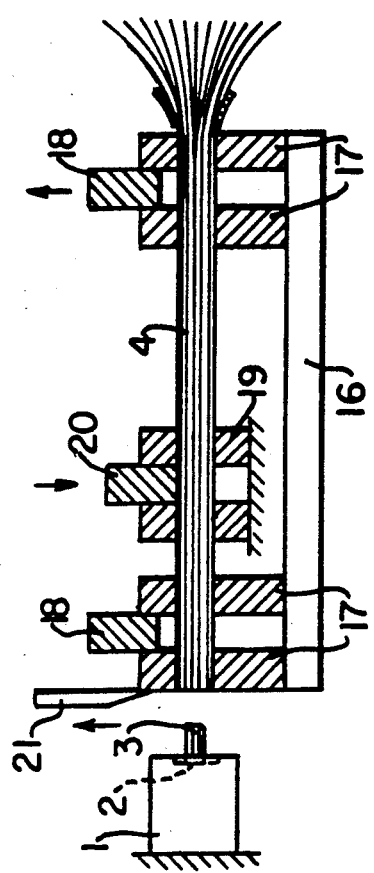
FIG. 10 shows the machine with released sliding clamping jaws.
Figure 12:
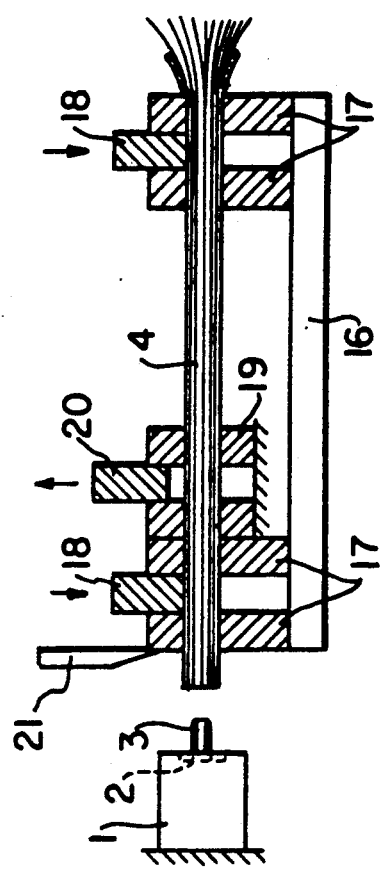
FIG. 12 shows the machine with the clamping jaws in their retaining position.
Figure 11:
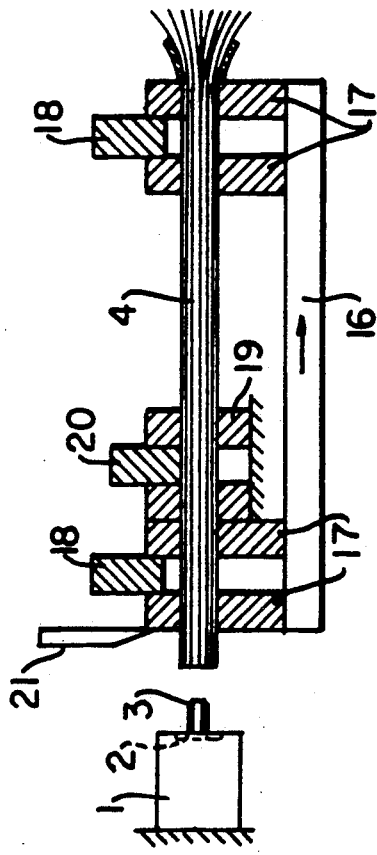
FIG. 11 shows the machine after the returning of the sliding bracket.

The fiber bundle 4 is then moved forward to abutment on the tool to be heated. This is effected by releasing the pressure jaws 18 and holding the fiber bundle in the stationary clamping jaw 19 by actuation of the pressure jaws 20, as shown in FIG. 10. By removing the bracket 16 away from the tool to the right in the direction of the arrow, a corresponding piece of fiber bundle can protrude beyond the frontmost clamping jaw 17, as shown in FIG. 11. The two pressure jaws 18 and the fixed pressure jaw 20 is released, as shown in FIG. 12.

By then moving the bracket 16 towards the tool 1, as shown in FIG. 13, the fiber bundle 4 will at the end touch the tool 1 in that the mandrel 3 will be situated among the fibers.

The tool is now heated and the fibers begin to melt. At the same time the bracket 16 is moved a further distance towards the tool, as shown in FIG. 14, whereby further fiber material is fed on a continuous basis during the melting for the formation of the bottom. Normally a surplus of material is carried forward in order that an additional bottom part 6a is formed, as shown in FIG. 18. This serves the purpose of ensuring that the final bottom 6 is always complete which is a safeguard against the fibers working loose in that they are incorporated in the bottom.

After heating, the fiber material is cooled while at the same time the pressure jaws 18 are released and the fixed pressure jaw 20 is actuated.

In this position the bracket 16 can be moved to the right, as shown in FIG. 15, in that the fiber bundle 4 remains in contact with the tool.

Once the cooling is completed, the knife 21 is moved downwards for cutting the fiber bundle, as shown in FIG. 16, and the finished brush head 5, 6 can fall down, as shown in FIG. 9. This complete cycle is then repeated.

Figure 19:
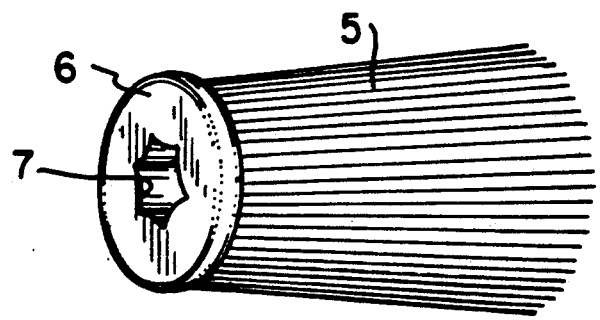
FIG. 19 shows the finished brush head in perspective.

As shown in FIG. 19, the further bottom material has been removed so that the brush head merely comprises the fibers 5 with the bottom 6 and bottom hole 7.

Although the present invention has been described with reference to particular embodiments and examples, it will be apparent to those skilled in the art that variations and modifications can be substituted therefor without departing from the principles and true spirit of the invention.

What is claimed is:

1. A method for producing a brush head from a bundle of parallel fibers or threads, comprising the steps of:
    feeding the bundle of parallel fibers or threads continuously to a melting means,
    melting the fibers at one end of said bundle of fibers as the bundles of fibers is continuously fed to the melting means so that said melted fibers are welded together to form a bottom plate with a surplus of the melted fibers forming an extended bottom plate, the bottom plate being sufficiently rigid so as to be directly attachable to a driving means;
    removing the extended bottom plate and cutting and shaping the fiber bundle opposite the bottom plate to form a brush.

2. The method of claim 1 wherein the brush is shaped to have a rounded tip and concave sloping sides.

3. The method of claim 1 wherein the brush is shaped to be generally concave.

4. A method for producing a brush head from a bundle of substantially parallel fibers or threads comprising the steps of feeding the bundle of parallel fibers or threads continuously to a melting means;
    melting the fibers at one end as said fibers move continuously into contact with the melting means, said melted fibers being welded together to from a bottom plate, a surplus of melted fiber forming an extended bottom plate, said bottom plate being sufficiently rigid so as to be directly attachable to a driving means; removing said extended bottom plate; and, cutting and shaping the end of said fiber bundle opposite the bottom plate to form a brush.

5. The method of claim 4 wherein the brush is shaped to have a rounded tip and concave sloping sides.

6. The method of claim 4 wherein the brush is shaped to be generally concave.

* * * * *

UNITED STATES PATENT AND TRADEMARK OFFICE
CERTIFICATE OF CORRECTION

PATENT NO. : 5,052,419

DATED : October 1, 1991

INVENTOR(S) : Hans Olsen

It is certified that error appears in the above-identified patent and that said Letters Patent is hereby corrected as shown below:

On the Title page, after "Notice:" delete "The portion of the term of this patent subsequent to Sep. 26, 2006 has been disclaimed."

Signed and Sealed this

Twenty-sixth Day of January, 1993

Attest:

STEPHEN G. KUNIN

Attesting Officer

Acting Commissioner of Patents and Trademarks